(12) United States Patent
Babic et al.

(10) Patent No.: US 11,869,009 B2
(45) Date of Patent: Jan. 9, 2024

(54) ORCHESTRATION OF FEEDBACK SIMULATION

(71) Applicant: Amadeus S.A.S., Biot (FR)

(72) Inventors: Angelina Petra Babic, Madrid (ES); Pablo Javier Clemente Sánchez, Madrid (ES); Miguel Lahoz García, Madrid (ES)

(73) Assignee: Amadeus S.A.S., Biot (FR)

( * ) Notice: Subject to any disclaimer, the term of this patent is extended or adjusted under 35 U.S.C. 154(b) by 186 days.

(21) Appl. No.: 17/527,234

(22) Filed: Nov. 16, 2021

(65) Prior Publication Data

US 2023/0153819 A1    May 18, 2023

(51) Int. Cl.
*G06Q 20/40*    (2012.01)
*G06F 16/2455*    (2019.01)
*G06F 3/0482*    (2013.01)
*H04L 67/12*    (2022.01)

(52) U.S. Cl.
CPC ....... *G06Q 20/4016* (2013.01); *G06F 3/0482* (2013.01); *G06F 16/24564* (2019.01); *H04L 67/12* (2013.01)

(58) Field of Classification Search
None
See application file for complete search history.

(56) References Cited

U.S. PATENT DOCUMENTS

| | | | |
|---|---|---|---|
| 11,113,760 B2* | 9/2021 | Rahaim | G06Q 20/22 |
| 11,144,716 B2* | 10/2021 | Hersbach | G06F 40/174 |
| 11,282,075 B1* | 3/2022 | Kettler | G06Q 20/085 |
| 2020/0050720 A1 | 2/2020 | Delisle et al. | |

FOREIGN PATENT DOCUMENTS

| | | |
|---|---|---|
| EP | 2902950 A1 | 8/2015 |
| WO | 2019084061 A1 | 5/2019 |

OTHER PUBLICATIONS

"Economic Scenario Generators, Jul. 2016, 94-109" (Year: 2016).*
European Patent Office, Extended European Search Report and Written Opinion issued in European patent application serial No. 22206696.1 dated Feb. 22, 2023, 10 pages.

* cited by examiner

*Primary Examiner* — Kito R Robinson
*Assistant Examiner* — Toan Duc Bui
(74) *Attorney, Agent, or Firm* — Thompson Hine LLP

(57) ABSTRACT

Methods, systems, and computer program products for implementing a payment orchestrator simulation process. A simulation initiation request including a user selected rules configuration is received at a simulation server via a simulation user interface on a user device. Rule events information associated with the simulation initiation request is obtained from a rule events server. A rule evaluation request is sent to a rules engine. Rule evaluation information associated with the rule evaluation request is obtained from the rules engine. Simulation results based on the rule evaluation information are determined. The simulation results are sent to the user device via the simulation user interface.

15 Claims, 9 Drawing Sheets

New Authorization Simulation

When you modify the set-up below, it will not impact the current set-up. It will only impact the simulation.

Simulation name

My simulation

You can select a base to create your simulation

Active set-up  Select a base ≡

More options ⌄          Create a rule ⊕       Simulate for past  1 ⌄  week ⌄     Edit priority ✎

Currently Viewing:                                                              Direct Sales

| Top Priority | Status | Parameters | Partner | Actions |
|---|---|---|---|---|
| ☐ | ACTIVATED<br>NCCC2 Japan<br>*Last modified 27 May 2021 11:14 by VIYENGAR*<br>*ID: 60eeba954588db76e 507ed36-0* | ⊕ VENDOR: AMEX, Mastercard, Japan Credit Bureau, Visa<br>⊕ COUNTRY: JP  ⊕ CHANNEL: Web<br>⊕ AUTHORIZATION CURRENCY: YEN | | [ ⋯ ]<br>Deactivate<br>[ Edit ]<br>Duplicate and Edit<br>Delete |
| ☐ | ACTIVATED<br>NCCC2 Tokyo office<br>*Last modified 27 May 2021 11:14 by* | ⊕ VENDOR: Mastercard, AMEX, Japan Credit Bureau, Visa<br>⊕ OFFICE ID: TPECI0200<br>⊕ CHANNEL: No Web | | |

FIG. 5

New Authorization Simulation

When you modify the set-up below, it will not impact the current set-up. It will only impact the simulation.

Simulation name: My simulation

You can select a base to create your simulation

Active set-up: Select a base

Simulate for past [1 ▾] [week ▾]

[More options ▾]  [Create a rule ⊕]  [Edit priority ✎]  Simulate ← 610

Currently Viewing: Direct Sales

| Top Priority | Status | Parameters | Partner | Actions |
|---|---|---|---|---|
| ☐ | ACTIVATED NCCC2 Japan Last modified 14 Jul 2021 12:22 by APPUJ1A01 ID: 60eeba954588db76e 507ed36-0 | ⊕ VENDOR: AMEX, Mastercard, Japan Credit Bureau, Visa<br>⊕ COUNTRY: JP  ⊕ CHANNEL: Web<br>⊕ AUTHORIZATION CURRENCY: YEN | MODIFIED | ⋯ |
| ☐ | ACTIVATED NCCC2 Tokyo office Last modified 27 May 2021 11:14 by VIYENGAR ID: 60eeba954588db76e 507ed36-1 | ⊕ VENDOR: Mastercard, AMEX, Japan Credit Bureau, Visa<br>⊕ OFFICE ID: TPECI0200<br>⊕ CHANNEL: No Web | | ⋯ |

FIG. 6

ORCHESTRATION OF FEEDBACK SIMULATION

TECHNICAL FIELD

The present invention generally relates to computers and computer software, and more specifically, to methods, systems, and computer program products for implementing a payment orchestrator simulation process.

BACKGROUND

In order for a merchant, such as a travel provider, to be able to handle moving towards a more standard retail industry approach for integrating multiple payment transactions from different software systems and fraud prevention (e.g., modern touchpoints, frictionless flows, removing intermediaries, and the like), a merchant may want to test or simulate new configurations or business rule setups before they go into production. The testing of simulations may help control in advance the potential risk of changing business rules in a simulated scenario.

Merchants need to integrate the various payment systems individually on their touchpoints in order to accept payments. For example, the airline industry may desire to offer payment scope (e.g., credit cards, digital payment vehicles, fraud check, and the like) on all the airline merchants digital touchpoints (e.g., booking, check-in, etc.). Offering a variety of payment options, authentication, fraud check, etc., may require an entity to try and set up several different business rules and configurations with multiple payment processors. In some conventional systems, testing/simulation tools use dummy data to configure and test new business rules setup. However, none of these conventional systems allow the possibility of generating a simulated rule setup to test with historical or near real-time production data. For example, once a new configuration was tested in the different test environments with dummy data, it was activated in production. However, the new configuration and rules couldn't be tested with production data.

Thus, improved methods, systems, and computer program products for providing simulation systems for optimizing business practices using production historical data (e.g., near real-time) are needed.

SUMMARY

In embodiments of the invention, a method for implementing a payment orchestrator simulation process. The method includes receiving, at a simulation server via a simulation user interface on a user device, a simulation initiation request, wherein the simulation initiation request includes a user selected rules configuration that includes rules configuration instructions to access a set of rules from one or more sets of rules. The method further includes obtaining, at the simulation server, rule events information associated with the simulation initiation request from a rule events server. The method further includes sending, by the simulation server, a rule evaluation request to a rules engine. The method further includes obtaining, at the simulation server, rule evaluation information associated with the rule evaluation request from the rules engine. The method further includes determining, at the simulation server, simulation results based on the rule evaluation information. The method further includes sending the simulation results to the user device via the simulation user interface.

These and other embodiments can each optionally include one or more of the following features.

In some embodiments of the invention, the simulation initiation request includes instructions to simultaneously send a corresponding set of rules to the rules engine. In some embodiments of the invention, the set of rules associated with the user selected rules configuration includes an active rules configuration, a previously used rules configuration, or a new rules configuration selected at the simulation user interface.

In some embodiments of the invention, the rule evaluation request includes the rule events information. In some embodiments of the invention, the rules event information includes historical data.

In some embodiments of the invention, sending the rule evaluation request to the rules engine and obtaining the rule evaluation information associated with the rule evaluation request from the rules engine includes sending, by the simulation server, the rule evaluation request to a platform services system, and obtaining, at the simulation server, the rule evaluation information associated with the rule evaluation request from the platform services system, wherein the platform services system obtained the rule evaluation information via the rules engine.

In some embodiments of the invention, the platform services system includes a payment platform system. In some embodiments of the invention, the platform services system obtained the rule evaluation information via the rules engine using the rule evaluation request. In some embodiments of the invention, prior to the simulation server obtaining the rule events information associated with the simulation initiation request from the rule events server, the rule events server obtains application rule events information from the platform services system.

In some embodiments of the invention, sending the simulation results to the user device via the simulation user interface includes a comparison chart between live data and data associated with the simulation results.

In some embodiments of the invention, the user device is configured to allow a user to select the user selected rules configuration used to determine the simulation results for a live production.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 5 illustrates an example screenshot for a payment orchestrator simulation processes via a simulation user interface, according to embodiments of the invention.

FIG. 6 illustrates an example screenshot for a payment orchestrator simulation processes via a simulation user interface, according to embodiments of the invention.

DETAILED DESCRIPTION

Merchants seek consultative tools and payment processes to better optimize their business practices and evaluate the potential risks of changing one or more their business rules (e.g., using particular payment processors, vendors, suppliers, etc.). This disclosure provides different capabilities to test or simulate new configurations or setups before they go into production, controlling in advance the potential risk of changing business rules in a simulated scenario with real-time data and historic data. The simulation tools discussed herein can empower merchants to quickly understand the implications of a new setup based on what would have happened, using historical data collected close to real time and applying to it a simulated rule set. The simulations may also allow merchants to react quicker to market changes with zero (or limited) risk and check assumptions of changing one or more business rules. The simulations may also allow merchants to promote continuous improvements as a corrective process to optimize business practices by running multiple simulations (e.g., hourly, daily, weekly, etc.), and allow a merchant to favor a particular supplier.

The technology in this patent application is related to systems and methods for implementing a payment orchestrator simulation process as a feature in an exchange payment platform system. The payment orchestrator simulation provides the customer with the possibility of generate a simulated scenario for payment link partner determination processing, using historical production traffic, without impacting the existing configuration of payment business rules in current production. A payment orchestrator simulation process may utilize one or more simulator servers that are in communication with the user devices, rules engine(s), rule events server(s), and one or more payment server(s) (e.g., common payment services (CPS)). The payment orchestrator simulation process integrates a process as a single user interface (UI) to perform simulations with historical production traffic and real-time data. A simulation instruction set dynamically loads historical production traffic and real-time data from third party systems when needed, hides complexity from a merchant point of view, and provides effortless integration for simulated business rules for each merchant. In some implementations, the simulation process described herein can be utilized for different business rule systems and is not limited to a payment platform systems.

Although the examples provided herein reference the travel industry, the simulation processes described may be applied to any order management system.

Figure 1:
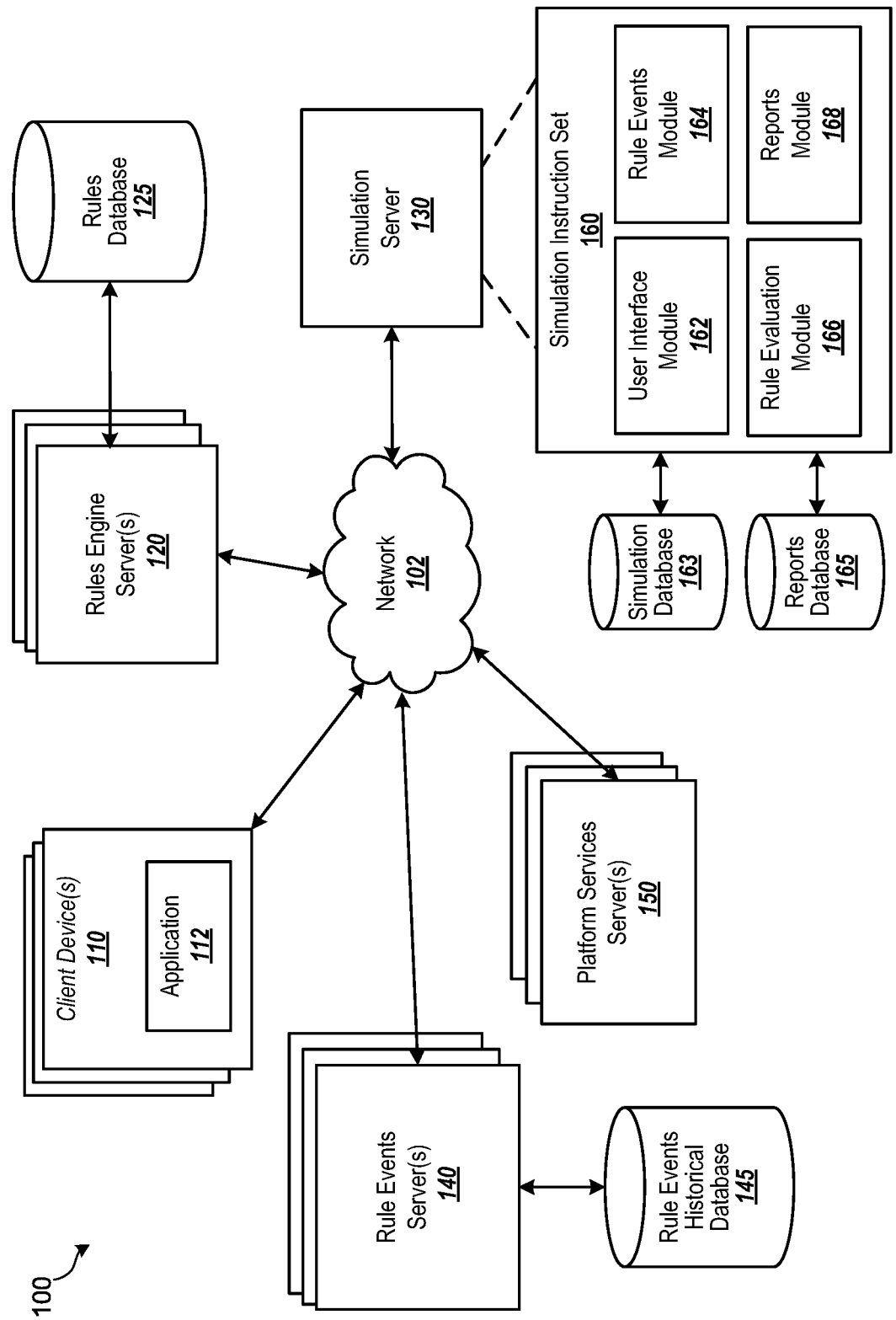
FIG. 1 illustrates an exemplary environment for implementing a payment orchestrator simulation process, according to embodiments of the invention.

FIG. 1 is an example environment 100 for implementing a payment orchestrator simulation process, according to embodiments of the invention. The example environment 100 includes one or more client device(s) 110, one or more rules engine server(s) 120, simulation server 130, one or more rule events server(s) 140, and one or more platform services server(s) 150, that communicate over a data communication network 102, e.g., a local area network (LAN), a wide area network (WAN), the Internet, a mobile network, or a combination thereof.

The one or more client device(s) 110 (e.g., a device used by a simulation requestor, such as a merchant) can include a desktop, a laptop, a server, or a mobile device, such as a smartphone, tablet computer, and/or other types of mobile devices. Additionally, the one or more client device(s) 110 may be public uses devices such as a kiosk, a user terminal, and the like. The one or more client device(s) 110 includes applications, such as the application 112, for managing a simulation request to/from the simulation server 130, as well as providing the initial rulesets to the one or more rules engine server(s) 120. The one or more client device(s) 110 can include other applications. The one or more client device(s) 110 initiates a simulation request by a requestor via application 112. The simulation request may include instructions that include one or more sets of rules setup by the requesting entities (such as clients, applications, browsers installed on user terminals, etc.) in the course of a simulation (e.g., generate a simulated scenario for payment link partner determination processing). The one or more client device(s) 110 may be utilized by a customer (e.g., a merchant) to review simulation results and react quicker to market changes with zero (or limited) risk and check assumptions of changing one or more business rules in production. In an exemplary implementation, a requestor of a simulation using the one or more client device(s) 110 may include a travel merchant (i.e., an airline agency, a travel agency, other dedicated global distribution systems (GDS)) to better optimize their business practices and evaluate the potential risks of changing one or more their business rules (e.g., using particular payment processors, vendors, suppliers, etc.).

The one or more rules engine server(s) 120 manages simulation rulesets received from application 112 from the one or more client devices 110. The one or more rules engine server(s) 120 may be a personal computing device, tablet computer, thin client terminal, smart phone and/or other such computing device. The one or more rules engine server(s) 120 may also be referred to herein as the "Rules Engine". In an exemplary implementation, a rule engine server 120 receives a set of rules associated with a user selected rules configuration that may be entered by a user at client device 110 via a simulation user interface. The user selected rules configuration may include an active rules configuration (e.g., current rules), a previously used rules configuration (e.g., historical rules from a previous simulation), or a new rules configuration, to initiate a simulation. The one or more rules engine server(s) 120 may also access historical rules from a previous simulation and/or store active rules configurations in the rules database 125.

Additionally, the one or more rules engine server(s) 120 manages rule evaluation requests received from the one or more platform services server(s) 150. In an exemplary implementation, a rules engine server 120 receives a rule evaluation request from a platform services server 150. For example, a rule evaluation request may be associated with the user selected rules configuration that was entered at the client device 110, and the rule evaluation request may be obtained from platform services server 150 and initiated at the simulation server 130.

The one or more rule events server(s) 140 manages rule events requests received from the simulation server 130. In an exemplary implementation, a rules events server 140 receives a rule event request from a simulation server 130. For example, a rule event request may be associated with the user selected rules configuration that was entered at the client device 110. The one or more rules events server(s) 140 may access historical rule events from real-time data. Additionally, the one or more rules events server(s) 140 may also access historical rule events from a previous simulation and/or store active rules configurations in the rules events historical database 145. The rules events historical database 145 may be used to collect historical data close to real time such that a simulation is using that near real time data for the simulation to predict an outcome if the simulated rules were used in production (e.g., live data).

The one or more platform services server(s) 150 manages rule evaluation requests and rule evaluation responses that are received between the simulation server 130 and the one or more rules engine server(s) 120. The one or more platform services server(s) 150 may be a personal computing device, tablet computer, thin client terminal, smart phone and/or other such computing device. The one or more platform services server(s) 150 may be front end server(s) for managing, collecting, processing, and communicating payment records (e.g., payment requests, resource information, revenues management data, bookings data, airlines/system configurations data, etc.), that is stored in a payment record database. Further, the one or more platform services server(s) 150 may be front end server(s) for managing, collecting, processing, and communicating payment requests and payment data from one or more travel provider server(s) to the one or more reservation server(s). In an exemplary implementation, the one or more platform services server(s) 150 may be payment processors for managing payment transactions. Payment processors include, for example, a credit/debit card issuer, a bank, digital payment service, etc., and the one or more servers for each payment processor generally facilitate remote communication therewith to authenticate and/or authorize a payment. The payment transaction data may be stored in one or more payment database(s) associated with each payment processor.

The simulation server 130 receives and processes the simulation request(s) from a client device 110. The simulation server 130 may be a personal computing device, tablet computer, thin client terminal, smart phone and/or other such computing device. The simulation server 130 includes a simulation instruction set 160 that performs a payment orchestrator simulation protocol according to processes described herein. The simulation instruction set 160 may include a simulation user interface module 162 for generating the simulation user interface. An example simulation user interface is further discussed herein with reference to simulation user interfaces of FIGS. 4-7.

In some implementations of the invention, the simulation instruction set 160 further includes a rule events module 164 for managing a rule events request to the rule events server 140. In some implementations of the invention, the simulation instruction set 160 further includes a rule evaluation module 166 for managing a rule evaluation request and response between the platform services server 150 and the rules engine server 120. The simulation instruction set 160 further includes a reports module 168 for generating reports for the requestor (e.g., live transactions compared to simulated transactions). An example simulation report and associated user interface is further discussed herein with reference to simulation user interface 702 of FIG. 7.

Figure 2:
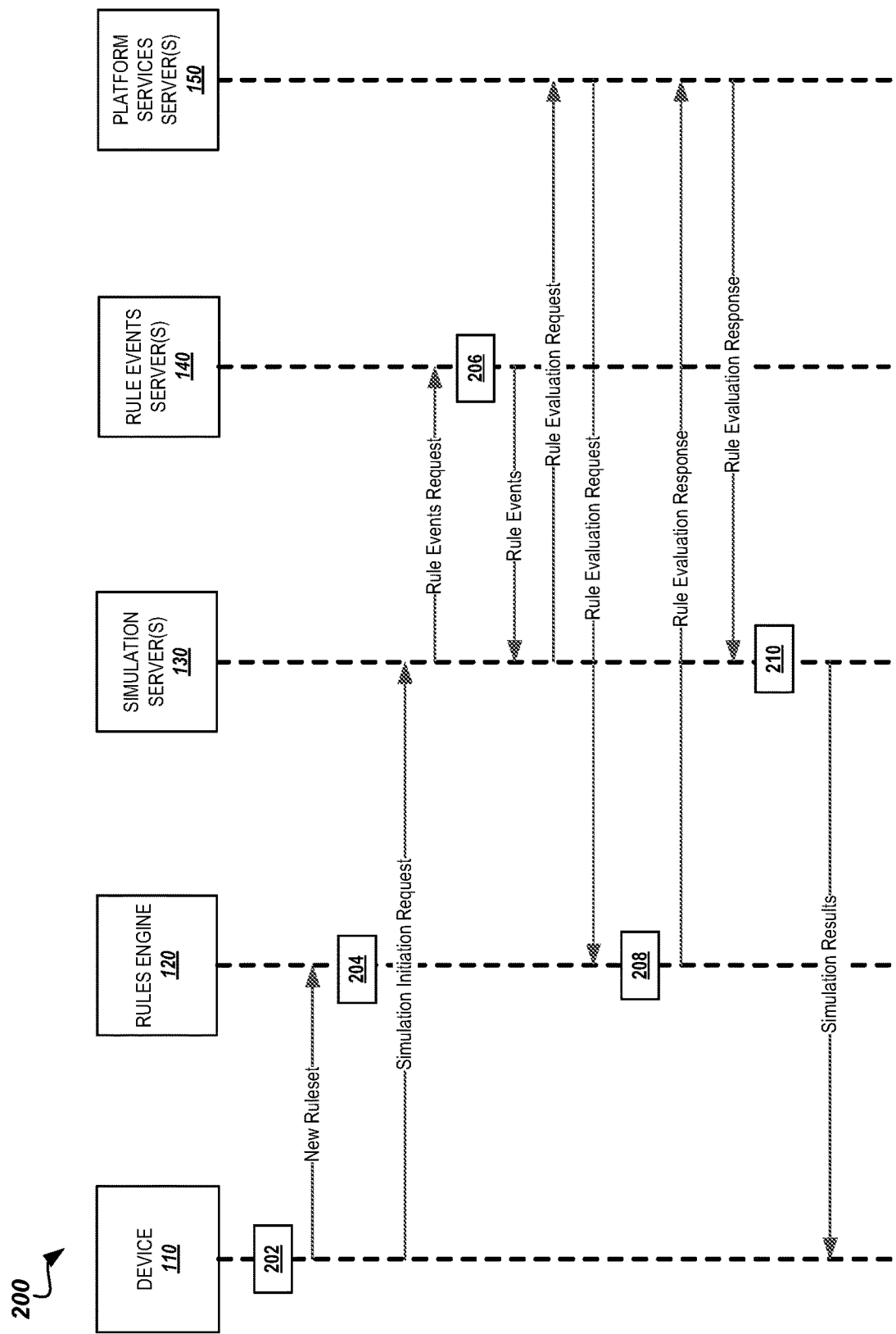
FIG. 2 illustrates an example routine in the form of a sequence diagram that may be performed by the environment shown in FIG. 1 as a procedure to facilitate a payment orchestrator simulation process, according to embodiments of the invention.

An example routine of implementing a payment orchestrator simulation protocol as illustrated in the environment of FIG. 1 is further discussed herein with reference to sequence diagram 200 of FIG. 2.

Figure 4:
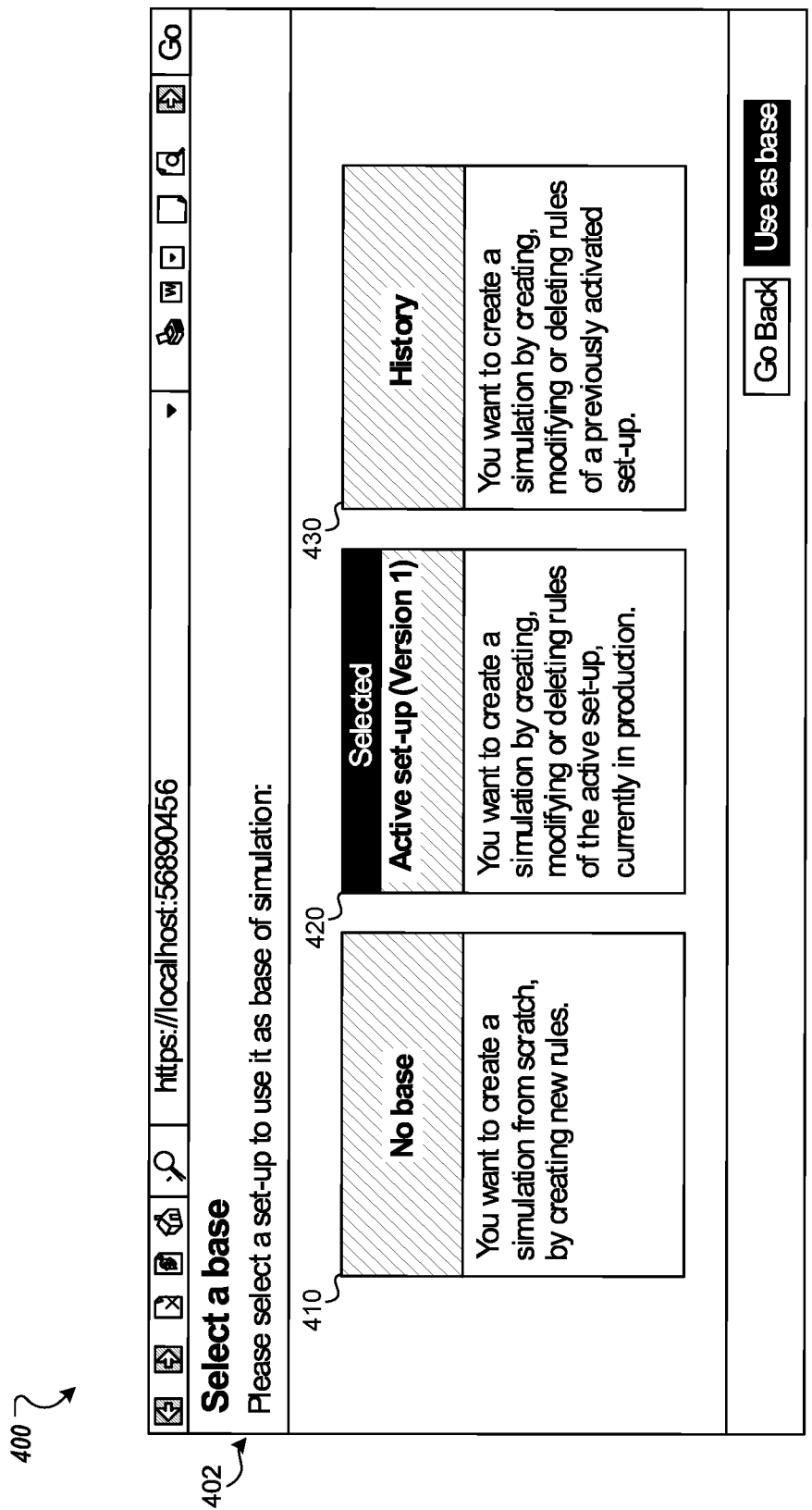
FIG. 4 illustrates an example screenshot for a payment orchestrator simulation processes via a simulation user interface, according to embodiments of the invention.

FIG. 2 illustrates an example routine in the form of a sequence diagram 200 that may be performed by the environment 100 shown in FIG. 1 as a procedure to facilitate a payment orchestrator simulation process, according to embodiments of the invention. FIG. 2 provides an exemplary routine that may be performed by the client device 110, the rules engine server(s) 120, the simulation server 130, the rule events server(s) 140, and/or the platform services server(s) 150, consistent with some embodiments of the invention to facilitate a payment orchestrator simulation process via a simulation user interface. The sequence diagram 200 is initiated at block 202 at a client device 110 via application 112 (e.g., a simulation is initiated at a consumer device that initiates a simulation website). For example, a user can select a base for the simulation before submitting the simulation initiation request. For example, as illustrated in FIG. 4, the base can be the active rules setup (e.g., element 420), an historic setup (e.g., element 430), or you can create a simulation from a set of rules configured from scratch (e.g., element 410). The simulation initiation is received by a rules engine server 120. In response, at block 204, the rules engine server 120 accesses the rules database 125 for the selected set of rules (if applicable).

After the rule set request is sent to the rules engine server 120, the client device 110 then sends a simulation initiation request to the simulation server 130. The simulation server 130 the requests a rule events from the rule events server 140. At block 206, the rule events server initiates a rule events analysis. For example, the one or more rules events server(s) 140 may access historical rule events from real-time data. The rules events historical database 145 may be used to collect historical data close to real time such that a simulation is using that near real time data for the simulation to predict an outcome if the simulated rules were used in production (e.g., live data). The rule events server 140 then sends the rule events information associated with the simulation initiation request to the simulation server 130. In response, the simulation server 130 sends a rule evaluation request to the one or more platform services server(s) 150, that, in turn, send the rule evaluation request to the rules engine server 120.

After receiving the rule evaluation request the one or more platform services server(s) 150, at block 208, the rules engine server 120 determines rule evaluation information and sends the rule evaluation information as a rule evaluation response to the one or more platform services server(s) 150. In response to receiving the rule evaluation response, the one or more platform services server(s) 150 provides the simulation server 130 with the rule evaluation information. For example, the rules engine server 120 provides the rule evaluation response to platform services server(s) 150, including the business rule to be used in a specific transaction.

After the simulation server 130 receive the rule evaluation information, then a simulation event can be processed, and simulation results are generated. For example, at block 210, the simulation server 130, the simulation server 130 run a simulation event to determine the simulation results. Then, the simulation server 130 send the simulation results to the client device 110 (e.g., via a reporting UI). For example, the simulation event provides the merchant with a visual understanding of the implications of a new rules setup based on what would have happened (e.g., historical data & shadow mode traffic), or actually happens in a controlled environment. The simulation results allow the client (e.g., the user that ran the simulation at the client device 110) with information to react quickly to market changes with limited risk, to check assumptions of changing one or more rules/configurations, promote continuous improvement in the rules/configurations, and/or favor particular suppliers or payment processors. For example, each payment processor (e.g., bank/acquirers, card schemes, etc.) may offer different rates, flat fees, etc., based on volume, total revenue, etc. Thus, a merchant can run different simulations on the each of the different payment processors to determine which one they may want to favor when providing the payment options to the customers of the merchant (e.g., incentivize their clients to use a particular payment processor because it would be more profitable for the merchant).

Figure 3:
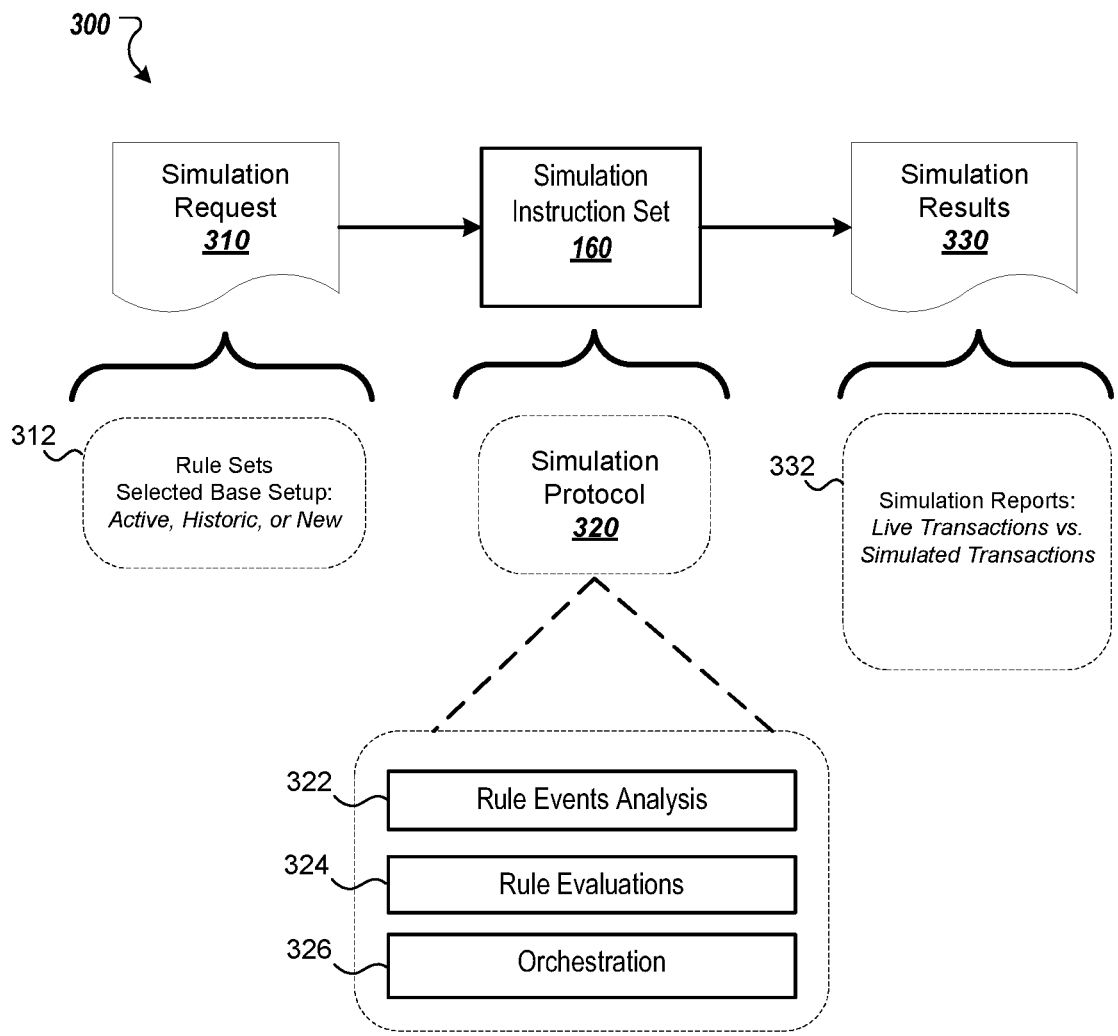
FIG. 3 illustrates example payment orchestrator simulation processes based on a simulation request, according to embodiments of the invention.

The actions of the simulation server 130 utilizing the simulation instruction set 160 to process a payment orchestrator simulation protocol are further described herein with reference to the illustration in FIG. 3.

FIG. 3 illustrates an example payment orchestrator simulation processes based on a simulation request, according to embodiments of the invention. In particular, FIG. 3 illustrates an example environment 300 for implementing a payment orchestrator simulation process to determine simulation results 330 based on receiving a simulation request 310. The simulation user interface (as illustrated in FIGS. 4-7) may be a web-based interface, a native application on a device, or any other type of interface. The objective for the simulation instruction set 160 is to display to an end user a simulation user interface with different simulation report options from multiple payment providers. For example, airline industry may desire to offer payment scope (e.g., credit cards, digital payment vehicles, fraud check, and the like) on all the airline merchants digital touchpoints (e.g., booking, check-in, etc.). For example, the simulation instruction set 160, stored on simulation server 130, receives a simulation request 310 (e.g., from a client device 110). The simulation request 310 includes user selected rules configuration information 312 (e.g., rule sets, a selected base setup, etc.) that is associated with one or more different business rules.

The simulation instruction set 160 initiates a payment orchestrator simulation protocol 320 (e.g., sequence diagram 200 of FIG. 2) to generate simulation results (e.g., simulation reports 332). The payment orchestrator simulation protocol 320 includes, for example, a rule events analysis module 322, a rule evaluations module 324, and an orchestration module 326. For example, the rule events analysis module 322 (e.g., block 206 of FIG. 2) may access historical rule events from a previous simulation and/or store active rules configurations in the rules events historical database 145. Additionally, the rule evaluations module 324 (e.g., block 208 of FIG. 2) can determine rule evaluation information. The payment orchestrator simulation protocol 320 further includes an orchestration module 326 for implementation of the simulation results 330 (e.g., simulation reports) between a client device 110 and one or more platform service server(s) 150 via a simulation server 130. An example user interface that includes the simulation results 330 (e.g., a simulation report that may include a comparison chart between live data and data associated with the simulation results) is further discussed herein with reference to simulation user interface 702 of FIG. 7.

FIG. 4 illustrates an example screenshot 400 for a payment orchestrator simulation processes via a simulation user interface 402, according to embodiments of the invention. The example screenshot 400 illustrates an example data flow to select a base for the simulation before submitting the simulation initiation request (e.g., simulation request 310). For example, as illustrated in FIG. 4, the base can be the active rules setup (e.g., element 420), an historic setup (e.g., element 430), or you can create a simulation from a set of rules configured from new rules (e.g., element 410). The simulation initiation is received by a rules engine server 120. In response, at block 204, the rules engine server 120 accesses the rules database 125 for the selected set of rules (if applicable).

FIG. 5 illustrates an example screenshot 500 for a payment orchestrator simulation processes via a simulation user interface 502, according to embodiments of the invention. The example screenshot 500 illustrates an example data flow within an orchestration module to view a set of payment authorization rules, which according to a criteria defined by the customer (e.g., parameters like currency or country) route the transactions to the different authorization partners of the customer. For example, as illustrated in FIG. 5, the user can view a priority level for each parameter (e.g., element 510), and change different parameters, such as vendors, using an editing feature (e.g., element 520). For example, a user can hover over each parameter/element, and right click that element to initiate the editing feature (e.g., element 520).

FIG. 6 illustrates an example screenshot 600 for a payment orchestrator simulation processes via a simulation user interface 602, according to embodiments of the invention. The example screenshot 600 illustrates an example data flow within an orchestration module to initiate a simulation after the user has finalized all parameters/elements as discussed for screenshot 500 of FIG. 5. For example, as illustrated in FIG. 6, the user can initiate a simulation by selecting "Simulate" icon (e.g., element 610).

Figure 7:
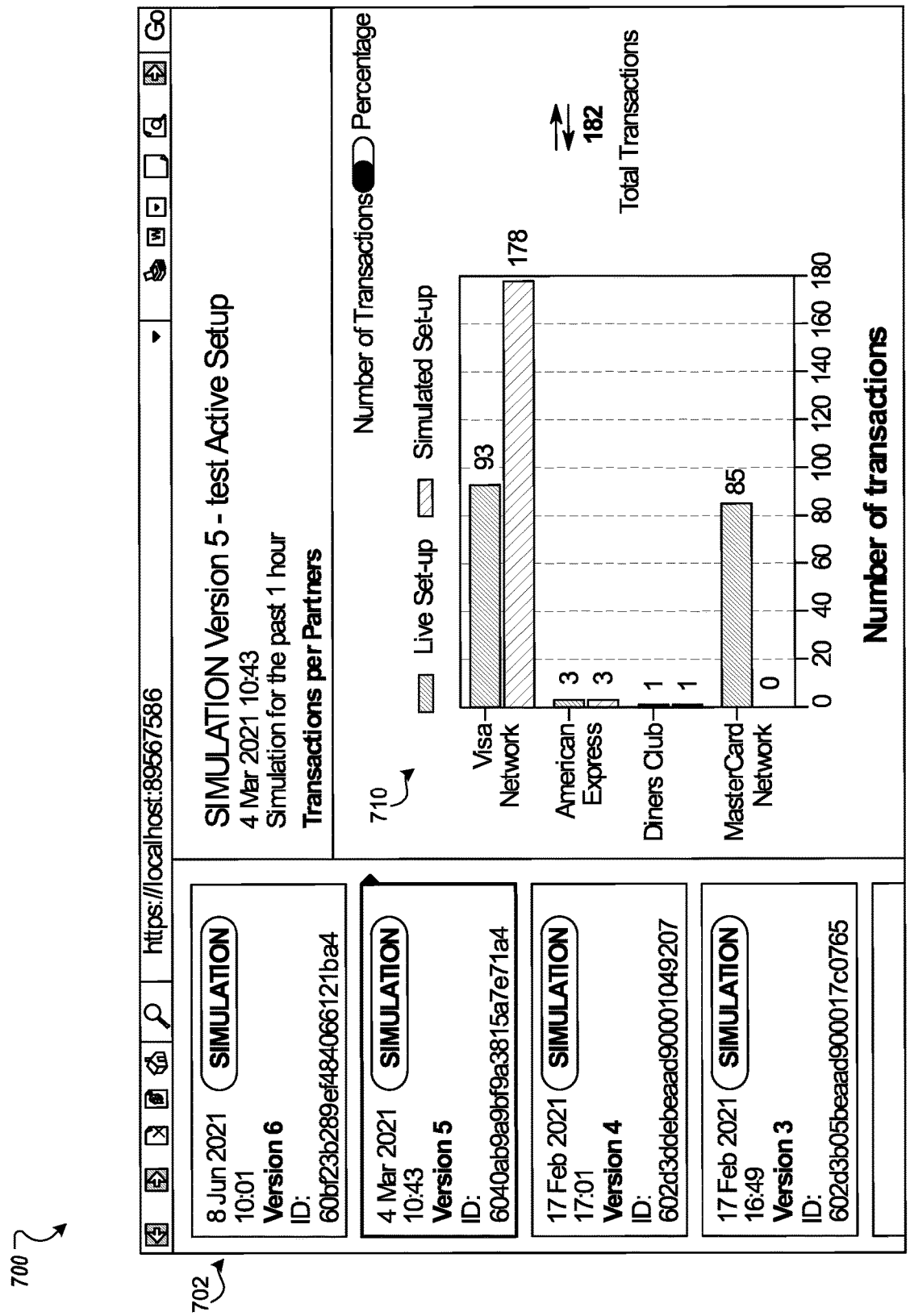
FIG. 7 illustrates an example screenshot for a payment orchestrator simulation processes via a simulation user interface, according to embodiments of the invention.

FIG. 7 illustrates an example screenshot 700 for a payment orchestrator simulation processes via a simulation user interface 702, according to embodiments of the invention. The example screenshot 700 illustrates an example data flow within an orchestration module to view simulation reports (e.g., live transactions compared to simulated transactions, such as simulation reports 332 of FIG. 3), after the user initiated a simulation as discussed for screenshot 600 of FIG. 6. For example, the simulation user interface 702 includes a comparison chart between live data and data associated with the simulation results (e.g., element 710).

Figure 8:
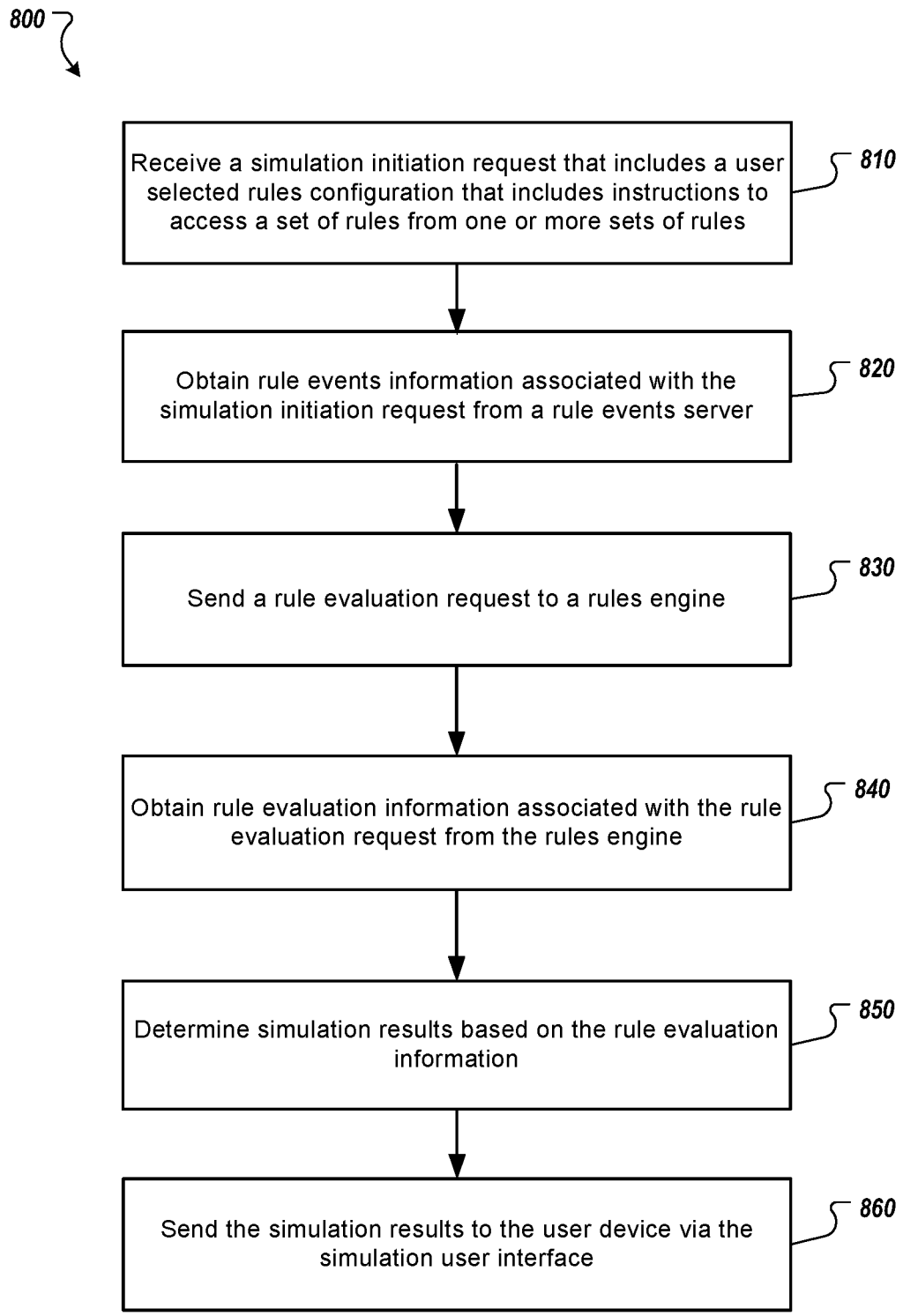
FIG. 8 is a flowchart of an example payment orchestrator simulation process, according to embodiments of the invention.

An example process of implementing a payment orchestrator simulation protocol as illustrated in FIGS. 2-7 is further discussed herein with reference to process 800 of FIG. 8.

FIG. 8 illustrates a flowchart of an example process 800 for implementing a payment orchestrator simulation process, according to embodiments of the invention. Operations of the process 800 can be implemented, for example, by a system that includes one or more data processing apparatus, such as simulation server 130 of FIG. 1 utilizing a simulation instruction set 160. The process 800 can also be implemented by instructions stored on computer storage medium, where execution of the instructions by a system that includes a data processing apparatus cause the data processing apparatus to perform the operations of the process 800.

The system receives a simulation initiation request that includes a user selected rules configuration that includes instructions to access a set of rules from one or more sets of rules (810). The simulation initiation request is received via a simulation user interface (e.g., screenshot 500 of FIG. 5) at a device (e.g., client device 110). For example, as illustrated in the sequence diagram 200 of FIG. 2, the client device 110 initiates a simulation initiation request to one of the simulation server 130.

In some embodiments of the invention, the set of rules associated with the user selected rules configuration includes an active rules configuration, a previously used rules configuration, or a new rules configuration selected at the simulation user interface. For example, a user can select a base (e.g., set up rules) for the simulation before submitting the simulation initiation request. For example, as illustrated in FIG. 4, the base can be the active rules setup (e.g., element 420), an historic setup (e.g., element 430), or you can create a simulation from a set of rules configured from scratch (e.g., element 410).

The system obtains rule events information associated with the simulation initiation request from a rule events server (820). For example, as illustrated in the sequence diagram 200 of FIG. 2, the simulation server 130 receives rule events from the one or more rule events server(s) 140. In particular, at block 206, the rule events server 140 initiates a rule events analysis. For example, the one or more rules events server(s) 140 may access historical rule events from a previous simulation and/or store active rules configurations in the rules events historical database 145. The rules events historical database 145 may be used to collect historical data close to real time such that a simulation is using that near real time data for the simulation to predict an outcome if the simulated rules were used in production (e.g., live data). The rule events server 140 then sends the rule events information associated with the simulation initiation request to the simulation server 130.

In some implementations of the invention, prior to the simulation server obtaining the rule events information associated with the simulation initiation request from the rule events server, the rule events server obtains application rule events information from the platform services server. For example, the rule events server 140, when initiating the rule events analysis at block 206, may first obtain application rule events information from the one or more platform services server(s) 150 prior to the simulation server 130 obtaining the rule events information associated with the simulation initiation request from the rule events server 140.

The system sends a rule evaluation request to a rules engine (830). For example, as illustrated in the sequence diagram 200 of FIG. 2, the simulation server 130 sends a rule evaluation request to the rules engine 120 (e.g., via the one or more platform services server(s) 150) after receiving the rule events information associated with the simulation initiation request from the rule event server 140. In some implementations of the invention, the rule evaluation request includes the rule events information. For example, the rules engine server 120 uses the rules event information and the set of rules to compute the rule evaluation information.

In some implementations of the invention, sending the rule evaluation request to the rules engine includes sending, by the simulation server, the rule evaluation request to a platform services system. For example, as illustrated in the sequence diagram 200 of FIG. 2, the simulation server 130 sends a rule evaluation request to the one or more platform services server(s) 150 after receiving the rule events information associated with the simulation initiation request from the rule event server 140. In some implementations of the invention, the platform services system (e.g., the one or more platform services server(s) 150) includes a payment platform system (e.g., a bank, credit card company, etc.).

The system obtains rule evaluation information associated with the rule evaluation request from the rules engine (840). For example, as illustrated in the sequence diagram 200 of FIG. 2, after receiving the rule evaluation request the one or more platform services server(s) 150, at block 208, the rules engine server 120 determines rule evaluation information and sends the rule evaluation information as a rule evaluation response to the one or more platform services server(s) 150. In response to receiving the rule evaluation response, the one or more platform services server(s) 150 provides the simulation server 130 with the rule evaluation information.

In some implementations of the invention, obtaining the rule evaluation information associated with the rule evaluation request from the rules engine includes obtaining, at the simulation server, the rule evaluation information associated with the rule evaluation request from the platform services system, wherein the platform services system obtained the rule evaluation information via the rules engine. For example, as illustrated in the sequence diagram 200 of FIG. 2, the simulation server 130 sends a rule evaluation request to the one or more platform services server(s) 150 after receiving the rule events information associated with the simulation initiation request from the rule event server 140. In some implementations of the invention, the rule evaluation request includes the rule events information. For example, the rules engine server 120 uses the rules event information and the set of rules to compute the rule evaluation information. In some implementations of the invention, the platform services system (e.g., the one or more platform services server(s) 150) includes a payment platform system (e.g., a bank, credit card company, etc.).

The system determines simulation results based on the rule evaluation information (850) and sends the simulation results to the user device via the simulation user interface (860). For example, as illustrated in the sequence diagram 200 of FIG. 2, at block 210, the simulation server 130, the simulation server 130 run a simulation event to determine the simulation results. Then, the simulation server 130 send the simulation results to the client device 110 (e.g., via a reporting UI). In some implementations of the invention, sending the simulation results to the user device via the simulation user interface includes a comparison chart between live data and data associated with the simulation results. For example, the simulation event provides the merchant with a visual understanding of the implications of a new rules setup based on what would have happened (e.g., historical data applied to a simulated scenario and live data), or actually happens in a controlled environment. The simulation results allow the client (e.g., the user that ran the simulation at the client device 110) with information to react quickly to market changes with limited risk, to check assumptions of changing one or more rules/configurations, promote continuous improvement in the rules/configurations, and/or favor particular suppliers or payment processors. For example, each payment processor (e.g., bank/acquirers, card schemes, etc.) may offer different rates, flat fees, etc., based on volume, total revenue, etc. Thus, a merchant can run different simulations on the each of the different payment processors to determine which one they may want to favor when providing the payment options to the customers of the merchant (e.g., incentivize their clients to use a particular payment processor because it would be more profitable for the merchant).

In some implementations of the invention, the simulation initiation request includes instructions to simultaneously send a corresponding set of rules to the rules engine server 120. For example, the simulation user interface can create a new ruleset for the simulation event and sends the new ruleset to the rules engine server 120, which can then store the new rules in the rules database 125.

In some implementations of the invention, the user device is configured to allow a user to select the user selected rules configuration used to determine the simulation results for a live production. For example, after a simulation is completed, the user via the simulation user interface at the client device 110 can apply directly in production the rules used in a simulated setup.

Figure 9:
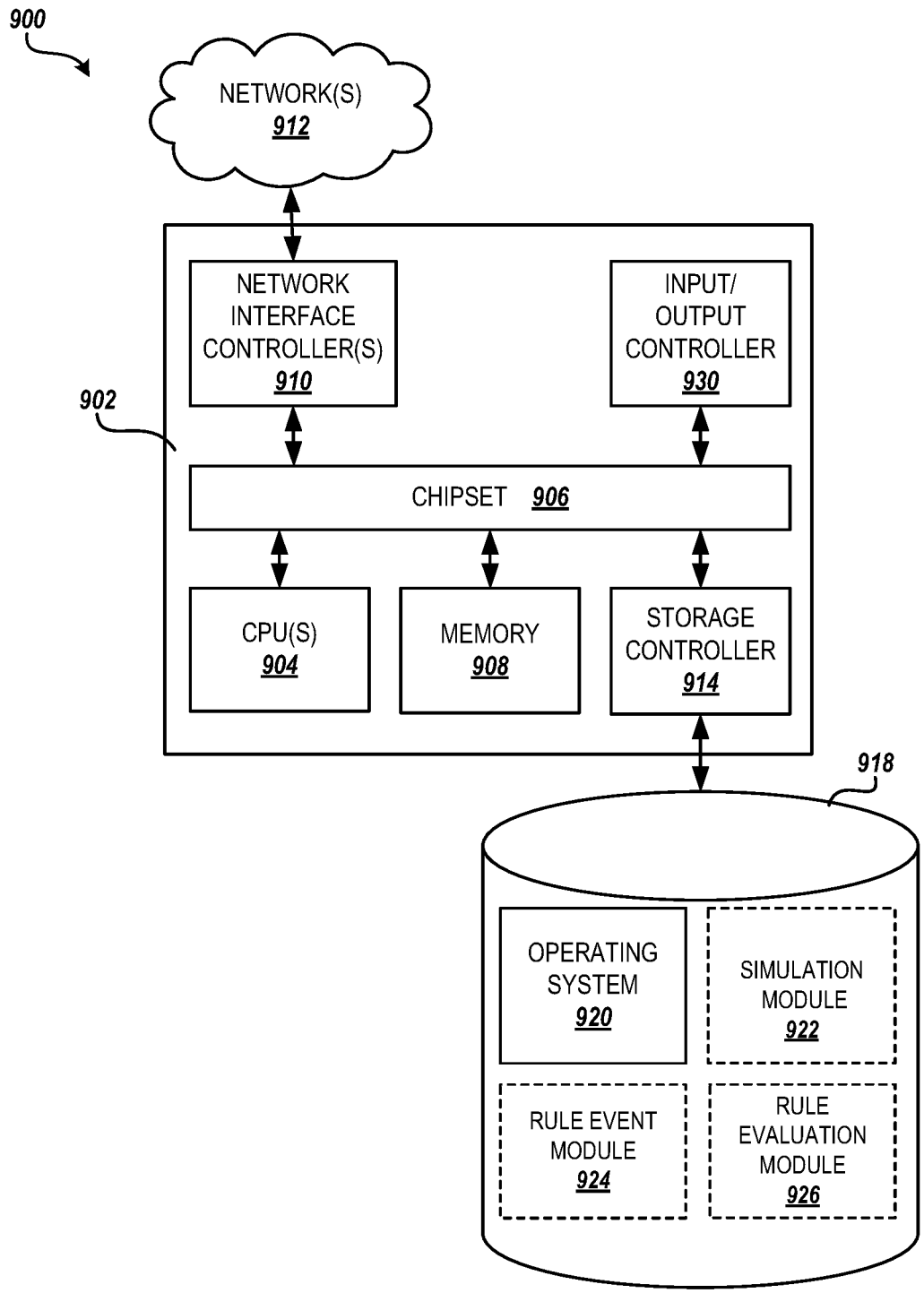
FIG. 9 is a block diagram showing an example computer architecture for a computer capable of executing the software components described herein, according to embodiments described herein.

FIG. 9 illustrates an example computer architecture 900 for a computer 902 capable of executing the software components described herein for the sending/receiving and processing of tasks. The computer architecture 900 (also referred to herein as a "server") shown in FIG. 9 illustrates a server computer, workstation, desktop computer, laptop, a server operating in a cloud environment, or other computing device, and may be utilized to execute any aspects of the software components presented herein described as executing on a host server, or other computing platform. The computer 902 preferably includes a baseboard, or "motherboard," which is a printed circuit board to which a multitude of components or devices may be connected by way of a system bus or other electrical communication paths. In one illustrative embodiment, one or more central processing units (CPUs) 904 operate in conjunction with a chipset 906. The CPUs 904 can be programmable processors that perform arithmetic and logical operations necessary for the operation of the computer 902.

The CPUs 904 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 906 provides an interface between the CPUs 904 and the remainder of the components and devices on the baseboard. The chipset 906 may provide an interface to a memory 908. The memory 908 may include a random-access memory (RAM) used as the main memory in the computer 902. The memory 908 may further include a computer-readable storage medium such as a read-only memory (ROM) or non-volatile RAM (NVRAM) for storing basic routines that that help to startup the computer 902 and to transfer information between the various components and devices. The ROM or NVRAM may also store other software components necessary for the operation of the computer 902 in accordance with the embodiments described herein.

According to various embodiments, the computer 902 may operate in a networked environment using logical connections to remote computing devices through one or more networks 912, a local-area network (LAN), a wide-area network (WAN), the Internet, or any other networking topology known in the art that connects the computer 902 to the devices and other remote computers. The chipset 906 includes functionality for providing network connectivity through one or more network interface controllers (NICs) 910, such as a gigabit Ethernet adapter. For example, the NIC 910 may be capable of connecting the computer 902 to other computer devices in the utility provider's systems. It should be appreciated that any number of NICs 910 may be present in the computer 902, connecting the computer to other types of networks and remote computer systems beyond those described herein.

The computer 902 may be connected to at least one mass storage device 918 that provides non-volatile storage for the computer 902. The mass storage device 918 may store system programs, application programs, other program modules, and data, which are described in greater detail herein. The mass storage device 918 may be connected to the computer 902 through a storage controller 914 connected to the chipset 906. The mass storage device 918 may consist of one or more physical storage units. The storage controller 914 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 902 may store data on the mass storage device 918 by transforming the physical state of the physical storage units to reflect the information being stored. The specific transformation of physical state may depend on various factors, in different embodiments of the invention of this description. Examples of such factors may include, but are not limited to, the technology used to implement the physical storage units, whether the mass storage device 918 is characterized as primary or secondary storage, or the like. For example, the computer 902 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 902 may further read information from the mass storage device 918 by detecting the physical states or characteristics of one or more particular locations within the physical storage units.

The mass storage device 918 may store an operating system 920 utilized to control the operation of the computer 902. According to some embodiments, the operating system includes the LINUX operating system. According to another embodiment, the operating system includes the WINDOWS® SERVER operating system from MICROSOFT Corporation of Redmond, Wash. According to further embodiments, the operating system may include the UNIX or SOLARIS operating systems. It should be appreciated that other operating systems may also be utilized. The mass storage device 918 may store other system or application programs and data utilized by the computer 902, such as simulation module 922 to orchestrate the simulation process, a rule event module 924 for managing access to historical rule events from a previous simulation and/or store active rules configurations in the rules events historical database, and a rule evaluation module 926 for managing rule evaluation information, according to embodiments described herein. Other system or application programs and data utilized by the computer 902 may be provided as well (e.g., a payment processing module, a security module, a user interface module, etc.).

In some embodiments, the mass storage device 918 may be encoded with computer-executable instructions that, when loaded into the computer 902, transforms the computer 902 from being a general-purpose computing system into a special-purpose computer capable of implementing the embodiments described herein. These computer-executable instructions transform the computer 902 by specifying how the CPUs 904 transition between states, as described above. According to some embodiments, from the simulation server 130 perspective, the mass storage device 918 stores computer-executable instructions that, when executed by the computer 902, perform portions of the process 800, for implementing a simulation system, as described herein. In further embodiments, the computer 902 may have access to other computer-readable storage medium in addition to or as an alternative to the mass storage device 918.

The computer 902 may also include an input/output controller 930 for receiving and processing input from a number of input devices, such as a keyboard, a mouse, a touchpad, a touch screen, an electronic stylus, or other type of input device. Similarly, the input/output controller 930 may provide output to a display device, such as a computer monitor, a flat-panel display, a digital projector, a printer, a plotter, or other type of output device. It will be appreciated that the computer 902 may not include all of the components shown in FIG. 9, may include other components that are not explicitly shown in FIG. 9, or may utilize an architecture completely different than that shown in FIG. 9.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computer-implemented method comprising:
receiving, at a simulation server via a simulation user interface on a user device, a simulation initiation request, wherein the simulation initiation request includes: i) a user selected rules configuration that comprises rules configuration instructions to access a set of rules from one or more sets of rules, and ii) a user selected historical data configuration;
obtaining, at the simulation server and based on the user selected rules configuration and historical data configuration, rule events information associated with the simulation initiation request from a rule events server, wherein the rules event information comprises historical rules events that includes historical production data and real-time production data that has been stored on a rule events historical database associated with the rule events server;
sending, by the simulation server, a rule evaluation request to a rules engine;
obtaining, at the simulation server, rule evaluation information associated with the rule evaluation request from the rules engine;
determining, at the simulation server, simulation results by dynamically loading the historical production data and the real-time production data into the simulation server based on a simulation instruction set and the rule evaluation information; and
sending the simulation results to the user device via the simulation user interface,
wherein sending the simulation results to the user device via the simulation user interface comprises a comparison chart between live data and data associated with the simulation results; and
wherein sending the rule evaluation request to the rules engine and obtaining the rule evaluation information associated with the rule evaluation request from the rules engine comprises:
sending, by the simulation server, the rule evaluation request to a payment platform system.

2. The method of claim 1, wherein the simulation initiation request comprises instructions to simultaneously send a corresponding set of rules to the rules engine.

3. The method of claim 1, wherein the set of rules associated with the user selected rules configuration comprises an active rules configuration, a previously used rules configuration, or a new rules configuration selected at the simulation user interface.

4. The method of claim 1, wherein the rule evaluation request comprises the rule events information.

5. The method of claim 1, wherein sending the rule evaluation request to the rules engine and obtaining the rule evaluation information associated with the rule evaluation request from the rules engine further comprises:
obtaining, at the simulation server, the rule evaluation information associated with the rule evaluation request from the platform services system, wherein the platform services system obtained the rule evaluation information via the rules engine.

6. The method of claim 5, wherein the platform services system obtained the rule evaluation information via the rules engine using the rule evaluation request.

7. The method of claim 5, wherein, prior to the simulation server obtaining the rule events information associated with the simulation initiation request from the rule events server, the rule events server obtains application rule events information from the platform services system.

8. The method of claim 1, wherein the user device is configured to allow a user to select the user selected rules configuration used to determine the simulation results for a live production.

9. A computing apparatus comprising:
one or more processors;
at least one memory device coupled with the one or more processors; and
a data communications interface operably associated with the one or more processors,
wherein the at least one memory device contains a plurality of program instructions that, when executed by the one or more processors, cause the computing apparatus to:
receive, via a simulation user interface on a user device, a simulation initiation request, wherein the simulation initiation request includes: i) a user selected rules configuration that comprises rules configuration instructions to access a set of rules from one or more sets of rules, and ii) a user selected historical data configuration;
obtain, based on the user selected rules configuration and historical data configuration, rule events information associated with the simulation initiation request from a rule events server, wherein the rules event information comprises historical rules events that includes historical production data and real-time production data that has been stored on a rule events historical database associated with the rule events server;
send a rule evaluation request to a rules engine;
obtain rule evaluation information associated with the rule evaluation request from the rules engine;
determine simulation results by dynamically loading the historical production data and the real-time production data based on a simulation instruction set and the rule evaluation information; and
send the simulation results to the user device via the simulation user interface,
wherein send the simulation results to the user device via the simulation user interface comprises a comparison chart between live data and data associated with the simulation results; and
wherein send the rule evaluation request to the rules engine and obtain the rule evaluation information associated with the rule evaluation request from the rules engine comprises the plurality of program instructions to further cause the computing apparatus to:
send the rule evaluation request to a payment platform system.

10. The computing apparatus of claim 9, wherein the simulation initiation request comprises instructions to simultaneously send a corresponding set of rules to the rules engine.

11. The computing apparatus of claim 9, wherein the set of rules associated with the user selected rules configuration comprises an active rules configuration, a previously used rules configuration, or a new rules configuration selected at the simulation user interface.

12. The computing apparatus of claim 9, wherein the rule evaluation request comprises the rule events information.

13. The computing apparatus of claim 9, wherein send the rule evaluation request to the rules engine and obtain the rule evaluation information associated with the rule evaluation request from the rules engine comprises the plurality of program instructions to further cause the computing apparatus to:

obtain the rule evaluation information associated with the rule evaluation request from the platform services system, wherein the platform services system obtained the rule evaluation information via the rules engine.

14. The computing apparatus of claim 13, wherein the platform services system obtained the rule evaluation information via the rules engine using the rule evaluation request.

15. A non-transitory computer storage medium encoded with a computer program, the computer program comprising a plurality of program instructions that when executed by one or more processors cause the one or more processors to perform operations comprising:

receive, via a simulation user interface on a user device, a simulation initiation request, wherein the simulation initiation request includes: i) a user selected rules configuration that comprises rules configuration instructions to access a set of rules from one or more sets of rules, and ii) a user selected historical data configuration;

obtain, based on the user selected rules configuration and historical data configuration, rule events information associated with the simulation initiation request from a rule events server, wherein the rules event information comprises historical rules events that includes historical production data and real-time production data that has been stored on a rule events historical database associated with the rule events server;

send a rule evaluation request to a rules engine;

obtain rule evaluation information associated with the rule evaluation request from the rules engine;

determine simulation results by dynamically loading the historical production data and the real-time production data based on a simulation instruction set and the rule evaluation information; and send the simulation results to the user device via the simulation user interface, wherein send the simulation results to the user device via the simulation user interface comprises a comparison chart between live data and data associated with the simulation results; and wherein send the rule evaluation request to the rules engine and obtain the rule evaluation information associated with the rule evaluation request from the rules engine further comprises:

send the rule evaluation request to a payment platform system.

\* \* \* \* \*